(12) United States Patent
McCullough

(10) Patent No.: US 8,417,738 B2
(45) Date of Patent: *Apr. 9, 2013

(54) METHOD FOR CLIENT-SIDE PERSONALIZATION

(75) Inventor: Sean M. McCullough, Austin, TX (US)

(73) Assignee: Open Text S.A., Luxembourg, Grand Duchy of Luxembourg (LU)

( * ) Notice: Subject to any disclaimer, the term of this patent is extended or adjusted under 35 U.S.C. 154(b) by 38 days.

This patent is subject to a terminal disclaimer.

(21) Appl. No.: 13/071,282

(22) Filed: Mar. 24, 2011

(65) Prior Publication Data

US 2011/0173255 A1 Jul. 14, 2011

Related U.S. Application Data

(60) Division of application No. 12/685,572, filed on Jan. 11, 2010, now Pat. No. 8,131,777, which is a continuation of application No. 11/047,961, filed on Feb. 1, 2005, now Pat. No. 7,668,834, which is a continuation of application No. 09/681,763, filed on Jun. 1, 2001, now Pat. No. 6,865, 574.

(60) Provisional application No. 60/208,891, filed on Jun. 2, 2000.

(51) Int. Cl.
*G06F 17/30* (2006.01)

(52) U.S. Cl.
USPC ............ 707/803; 707/770; 707/784; 709/203

(58) Field of Classification Search .................. 707/705, 707/770, 783, 784, 803, 999.09; 709/202, 709/203, 217; 715/223, 700, 760
See application file for complete search history.

(56) References Cited

U.S. PATENT DOCUMENTS

| | | | |
|---|---|---|---|
| 4,754,428 | A | 6/1988 | Schultz et al. |
| 4,811,207 | A | 3/1989 | Hikita et al. |
| 5,210,824 | A | 5/1993 | Putz et al. |
| 5,212,787 | A | 5/1993 | Baker et al. |
| 5,226,161 | A | 7/1993 | Khoyi et al. |
| 5,257,369 | A | 10/1993 | Skeen et al. |
| 5,331,673 | A | 7/1994 | Elko et al. |
| 5,339,392 | A | 8/1994 | Risberg et al. |
| 5,421,015 | A | 5/1995 | Khoyi et al. |
| 5,572,643 | A | 11/1996 | Judson |

(Continued)

OTHER PUBLICATIONS

Kiyomitsu et al. Web Reconfiguration by Spatio-Temporal Page Personalization Rules based on Access Histories, Application and Internet, 2001, Proceddings. 2001 Symposium on Digital Object Identifier: 10.1109/SAINT.2001.905170 Publication Year: 2001, pp. 75-82.*

(Continued)

*Primary Examiner* — Greta Robinson
(74) *Attorney, Agent, or Firm* — Sprinkle IP Law Group

(57) ABSTRACT

A method or data processing system readable medium can be used for communications between a user and a network site. In one embodiment, the user may request personalization information including personalization rule(s) from the network site. The user can generate personalization logic based on the personalization information. In this manner, the user has better control over his or her personal information. The server computer at the network site may benefit because it does not have to generate the personalization logic for the user. Accordingly, the server computer at the network site may be able to accommodate more users or can respond to them faster.

20 Claims, 2 Drawing Sheets

U.S. PATENT DOCUMENTS

| | | | |
|---|---|---|---|
| 5,704,017 | A | 12/1997 | Heckerman et al. |
| 5,727,129 | A | 3/1998 | Barrett et al. |
| 5,732,218 | A | 3/1998 | Bland et al. |
| 5,740,430 | A | 4/1998 | Rosenberg et al. |
| 5,761,416 | A | 6/1998 | Mandal et al. |
| 5,774,660 | A | 6/1998 | Brendel et al. |
| 5,790,426 | A | 8/1998 | Robinson |
| 5,790,790 | A | 8/1998 | Smith et al. |
| 5,796,952 | A | 8/1998 | Davis et al. |
| 5,870,559 | A | 2/1999 | Leshem et al. |
| 5,878,223 | A | 3/1999 | Becker et al. |
| 5,884,282 | A | 3/1999 | Robinson |
| 5,918,014 | A | 6/1999 | Robinson |
| 5,958,008 | A | 9/1999 | Pogrebisky et al. |
| 5,991,735 | A | 11/1999 | Gerace |
| 6,012,052 | A | 1/2000 | Altschuler et al. |
| 6,041,311 | A | 3/2000 | Chislenko et al. |
| 6,049,777 | A | 4/2000 | Sheena et al. |
| 6,067,565 | A | 5/2000 | Horvitz |
| 6,076,166 | A | 6/2000 | Moshfeghi et al. |
| 6,085,226 | A | 7/2000 | Horvitz |
| 6,092,049 | A | 7/2000 | Chislenko et al. |
| 6,094,662 | A | 7/2000 | Hawes |
| 6,112,192 | A | 8/2000 | Capek |
| 6,112,279 | A | 8/2000 | Wang |
| 6,128,655 | A | 10/2000 | Fields et al. |
| 6,138,141 | A | 10/2000 | DeSimone et al. |
| 6,141,737 | A | 10/2000 | Krantz et al. |
| 6,185,586 | B1 | 2/2001 | Judson |
| 6,185,608 | B1 | 2/2001 | Hon et al. |
| 6,208,991 | B1 | 3/2001 | French et al. |
| 6,360,249 | B1 * | 3/2002 | Courts et al. ............... 709/203 |
| 6,393,479 | B1 | 5/2002 | Glommen |
| 6,480,850 | B1 | 11/2002 | Veldhuisen |
| 6,571,256 | B1 | 5/2003 | Dorian et al. |
| 6,571,279 | B1 | 5/2003 | Herz et al. |
| 6,604,113 | B1 | 8/2003 | Kenyon et al. |
| 6,615,213 | B1 | 9/2003 | Johnson |
| 6,622,168 | B1 | 9/2003 | Datta |
| 6,651,066 | B2 | 11/2003 | Baxter et al. |
| 6,714,926 | B1 | 3/2004 | Benson |
| 6,820,082 | B1 | 11/2004 | Cook et al. |
| 6,851,060 | B1 | 2/2005 | Shrader |
| 6,865,574 | B1 | 3/2005 | McCullough |
| 7,072,932 | B1 | 7/2006 | Stahl |
| 7,076,504 | B1 | 7/2006 | Handel et al. |
| 7,099,929 | B1 | 8/2006 | Adams |
| 7,203,721 | B1 | 4/2007 | Ben-Efraim et al. |
| 7,219,123 | B1 | 5/2007 | Fiechter et al. |
| 7,502,994 | B2 | 3/2009 | Kocol |
| 8,131,777 | B2 * | 3/2012 | McCullough ............... 707/803 |
| 2002/0152237 | A1 | 10/2002 | Cohen et al. |
| 2009/0172159 | A1 | 7/2009 | Kocol |

OTHER PUBLICATIONS

Office Action issued in U.S. Appl. No. 12/685,572, mailed Oct. 25, 2011, 8 pages.

Office Action for U.S. Appl. No. 12/685,572, mailed May 31, 2011, 11 pgs.

Kitts, "An Evaluation of Customer Retention and Revenue Forecasting in the Retail Sector: Investigation into the effects of Seasonality, Spending and Method," DataSage, Inc., Reading, MA, 1999, 63 pgs.

Kitts, "RMS Revenue and Retention Forecasting Final Phase Model Specification" by DataSage, Inc., Reading, MA, 2000, 16 pgs.

"Datasage Customer Analyst," DataSage, Inc., Reading, MA, 1999, 2 pgs.

Montgomery, Alan et al., "Estimating Price Elasticities with Theory-Based Priors," J. Marketing Research, vol. 36, Nov. 1999, pp. 413-23.

Simon, Herrman, "Price Management," Elsevier Sci. Publishing 1989, New York, NY, pp. 13-41.

Subrahmanyan and Shoemaker, "Developing Optimal Pricing and Inventory Policies for Retailers Who Face Uncertain Demand," J. Retailing, vol. 72, pp. 7-30, 1996.

Vilcassim and Chintagunta, "Investigating Retailer Product Category Pricing from Household Scanner Panel Data," J. Retailing, vol. 71, pp. 103-128, 1995.

Weinstein, Steve, "Tackling Technology," Bill Communications, Inc. Progressive Grocer, 1999.

Wellman, David, "Down in the (Data) Mines," Supermarket Business, pp. 33-35, May 1999.

Amato-McCoy, D.M., "New Customer Management System Returns Lost Sales to Dick's," Bill Communications, Inc., RT News, RT Magazine, Jun. 1999.

Miller, M., "Applications Integration-Getting It Together," PC Magazine, Feb. 8, 1994, pp. 111-112, 116-120, 136, 138.

Rapoza, J., PointCast 2.0 Eases Burden on Network; Improvements in Interface, Performance Make it a Solid Upgrade, 2 pgs., Jun. 2, 1997, PC Week, V.14, N.22J (Abstract).

Strom, David, The Best of Push, 6 pgs., Apr. 1997, PC Week (Abstract).

Aragon, L., When Shove Comes to Push, 7 pgs., Feb. 10, 1997, PC Week, V. 14, N.6 (Abstract).

thirdvoice.com—Home Page and Frequently Asked Questions (7 pages), www.thirdvoice.com, www.thirdvoice.com/help.20/faq.htm, 2000.

Office Action for U.S. Appl. No. 09/681,763, mailed Sep. 17, 2003, 6 pgs.

Office Action for U.S. Appl. No. 09/681,763, mailed Mar. 1, 2004, 7 pgs.

Office Action for U.S. Appl. No. 11/047,961, mailed Aug. 27, 2007, 13 pgs.

Office Action for U.S. Appl. No. 11/047,961, mailed Jan. 29, 2008, 10 pgs.

Office Action for U.S. Appl. No. 11/047,961, mailed Jul. 25, 2008, 10 pgs.

Notice of Allowance for U.S. Appl. No. 12/685,572, mailed Mar. 29, 2011, 7 pgs.

* cited by examiner

METHOD FOR CLIENT-SIDE PERSONALIZATION

RELATED APPLICATIONS

This application is a divisional of, and claims a benefit of priority under 35 U.S.C. 120 of the filing date of U.S. patent application Ser. No. 12/685,572 by inventor Sean M. McCullough entitled "Method for Client-Side Personalization" filed Jan. 11, 2010, issued as U.S. Pat. No. 8,131,777, which is continuation of, and claims a benefit of priority under 35 U.S.C. 120 of the filing date of U.S. patent application Ser. No. 11/047,961 by inventor Sean M. McCullough entitled "Method for Client-Side Personalization" filed on Feb. 1, 2005, issued as U.S. Pat. No. 7,668,834, which is a continuation of, and claims a benefit of priority under 35 U.S.C. 120 of the filing date of U.S. patent application Ser. No. 09/681,763 by inventor Sean M. McCullough entitled "Method for Client-Side Personalization" filed on Jun. 1, 2001, issued as U.S. Pat. No. 6,865,574, which in turn claims priority under 35 U.S.C. §119(e) to U.S. Patent Application No. 60/208,891 entitled "Method For Client-Side Personalization" by McCullough filed on Jun. 2, 2000. Each of the above are incorporated herein by reference.

FIELD OF THE INVENTION

This invention relates in general to methods and data processing system readable media, and more particularly, to methods of communicating between a user and a network site and data processing system readable media for carrying out those methods.

DESCRIPTION OF THE RELATED ART

When using the internet to access information, a user may, knowingly or unknowingly, be sending personal data regarding himself or herself to a website. This information may be in the form of cookies, preferences, or profile data files. The server may extract the personal data from the cookies, preferences, or profile data files to be used with personalization rules that are part of the personalization logic used at a website. That personal information may be used in constructing a page to be sent to the user. Server resources are consumed in preparing the personalization logic to be executed. This may limit the number of users that can access the website, slow response times of the website, or require more computer-related resources to maintain service levels compared to a system where personalization was not used.

The user may have concerns with the transmission or use of his or her personal information. Cookies may be placed on the user's computer by the website during a prior visit.

However, the user may not wish to have the information within that cookie used during a subsequent visit to the website because a user profile may be generated by the website over a period of visits.

Preferences may be set by the user for the computer's operation, for a browser application, or a combination thereof. Some of the preference information may be sensitive to some users. Other information within the preferences may not be sensitive when examined in isolation (one preference by itself). However, when taken in aggregate (all preferences), the likelihood of identifying a user may be more likely due to a "unique" combination of a large number of preferences that a user may specify. Profile data file(s) may be generated by the user or by a third party. The profile data file(s) may be transmitted when using the browser.

As an alternative, the user may use third-party anonymizing services so that the server computer for a website would be less likely to identify the user. These services are not a guarantee that personal information of the user will not be sent to another party. More particularly, the anonymizing service may accidentally send information that it is not to be disclosed to others. Additionally, some third-party services may consider selling customer information in an effort to raise funds or may be required to sell the confidential customer information by a trustee in bankruptcy. Therefore, the user relies on another party outside its control to manage personal information of the user.

A need exists for allowing personalization without using any more server resources than is needed. A need also exists for a user to determine what personal information is being sent to a network site in order to obtain information from that network site.

SUMMARY OF THE INVENTION

A method or data processing system readable medium can be used for communications between a user and a network site. The method or medium may allow a user to determine what, if any, personal information should be transmitted to the network site. In one embodiment, the user may generate personalization logic and send it and a network address to the network site. The server computer at the network site may be able to accommodate more users or can respond to them faster because the user may generate the personalization logic rather than the server computer having to generating it.

In one set of embodiments, a method of communicating with a client data processing system can comprise receiving a first communication from the client data processing system. The first communication may comprise a request for a personalization rule. The method can also comprise sending to the client data processing system the personalization rule. The method can further comprise receiving a second communication from the client data processing system. The second communication may comprise a network address for a network site and information corresponding to the personalization rule.

In another set of embodiments, a method of communicating with a network site can comprise sending a first communication to the network site. The first communication may comprise a request for a personalization rule. The method can also comprise receiving from the network site the personalization rule. The method can further comprise sending a second communication to the network site. The second communication may comprise a network address for the network site and information corresponding to the personalization rule.

In still another set of embodiments, a method for a user to communicate with a network site can comprise receiving a first communication from a user. Other than a network address for the user, the first communication may not include information substantially sufficient to specifically identify the user. The method can also comprise receiving a second communication from the user. The second communication may comprise a network address for the network site and a user information for a user corresponding to a personalization rule, wherein the user information is not part of the first communication.

In still other embodiments, a data processing system readable medium can have code embodied within it. The code can include instructions executable by a data processing system. The instructions may be configured to cause the data processing system to perform the methods described herein.

The foregoing general description and the following detailed description are exemplary and explanatory only are not restrictive of the invention, as claimed.

BRIEF DESCRIPTION OF THE DRAWINGS

The present invention is illustrated by way of example and not limitation in the accompanying figures, in which.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF A PREFERRED EMBODIMENT

Reference is now made in detail to the exemplary embodiments of the invention, examples of which are illustrated in the accompanying drawings. Wherever possible, the same reference numbers will be used throughout the drawings to refer to the same or like parts (elements).

A method or data processing system readable medium can be used for communications between a user and a network site. The user may request a personalization rule from a network site. The request may not have enough information for the user to be specifically identified. After receiving the personalization rule from the network site, the user can send user information corresponding to the personalization rule. The user has more control over his or her personal information and does not have to rely on a third party. The server computer at the network site may be able to accommodate more users or can respond to them faster because the user may generate personalization logic rather than the server computer having to generating it.

A few terms are defined or clarified to aid in understanding the descriptions that follow. A network includes an interconnected set of server and client computers over a publicly available medium (e.g., the internet) or over an internal (company-owned) system. A user at a client computer may gain access to the network using a network access provider. An Internet Service Provider ("ISP") is a common type of network access provider. A network address includes information that can be used by a server computer to locate information, whether internal to that server computer or at a different, remote computer or database. Uniform Resource Locators ("URLs") are examples of network addresses. A network site corresponds to a location specified by a network address. A website is a common type of network site. Note that the examples given within this paragraph are for purposes of illustration and not limitation.

Figure 1:
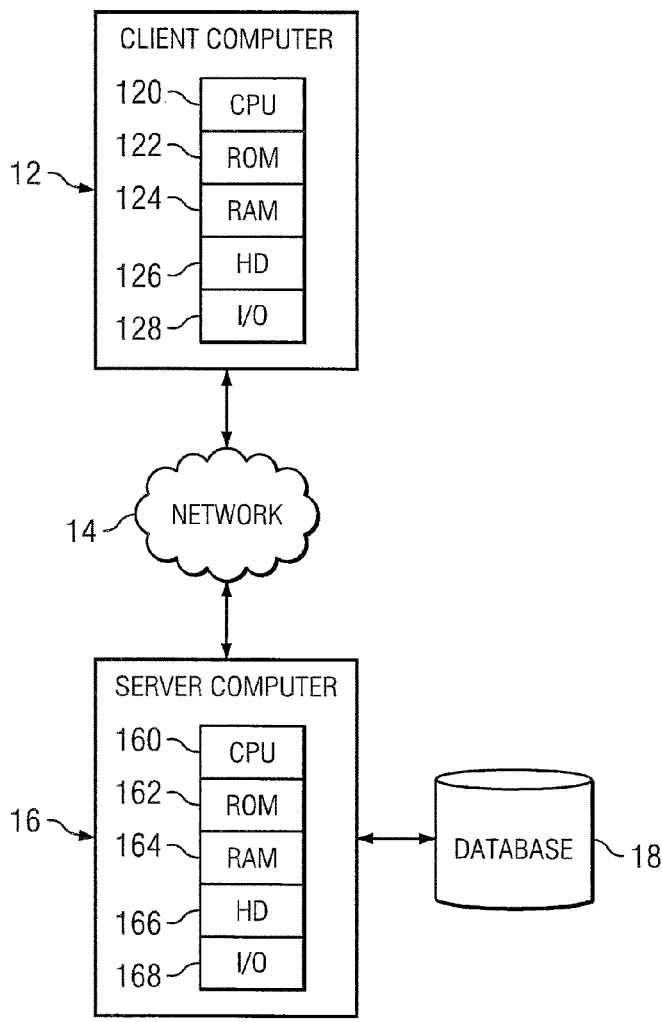
FIG. 1 includes an illustration of a hardware architecture for carrying out methods of communicating between a user and a network site.

Before discussing embodiments of the invention, a hardware architecture for using embodiments is described. FIG. 1 illustrates an exemplary architecture and includes a client computer 12 that is bi-directionally coupled to a network 14, and a server computer 16 that is bi-directionally coupled to the network 14 and database 18. The client computer 12 includes a central processing unit ("CPU") 120, a read-only memory ("ROM") 122, a random access memory ("RAM") 124, a hard drive ("HD") or storage memory 126, and input/output device(s) ("I/O") 128. The I/O devices 128 can include a keyboard, monitor, printer, electronic pointing device (e.g., mouse, trackball, etc.), or the like. The server computer 16 can include a CPU 160, ROM 162, RAM 164, HD 166, and I/O 168 similar to corresponding items in client computer 12.

Each of the client computer 12 and the server computer 16 is an example of a data processing system. ROM 122 and 162, RAM 124 and 164, HD 126 and 166, and the database 18 include media that can be read by the CPU 120 or 160. Therefore, each of these types of memories includes a data processing system readable medium. These memories may be internal or external to computers 12 and 16.

Figure 2:
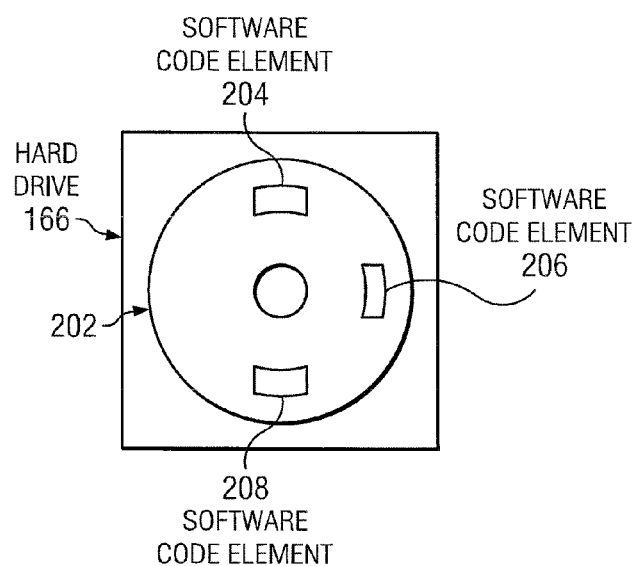
FIG. 2 includes an illustration of a data processing system readable medium including software code.

The methods described herein may be implemented in suitable software code that may reside within ROM 122 or 162, RAM 124 or 164, or HD 126 or 166. In addition to those types of memories, the instructions in an embodiment of the present invention may be contained on a data storage device with a different data processing system readable storage medium. FIG. 2 illustrates a combination of software code elements 204, 206, and 208 that are embodied within a data processing system readable medium 202 on HD 166. Alternatively, the instructions may be stored as software code elements on a DASD array, magnetic tape, floppy diskette, electronic read-only memory, optical storage device, CD ROM or other appropriate data processing system readable medium or storage device.

Figure 3:
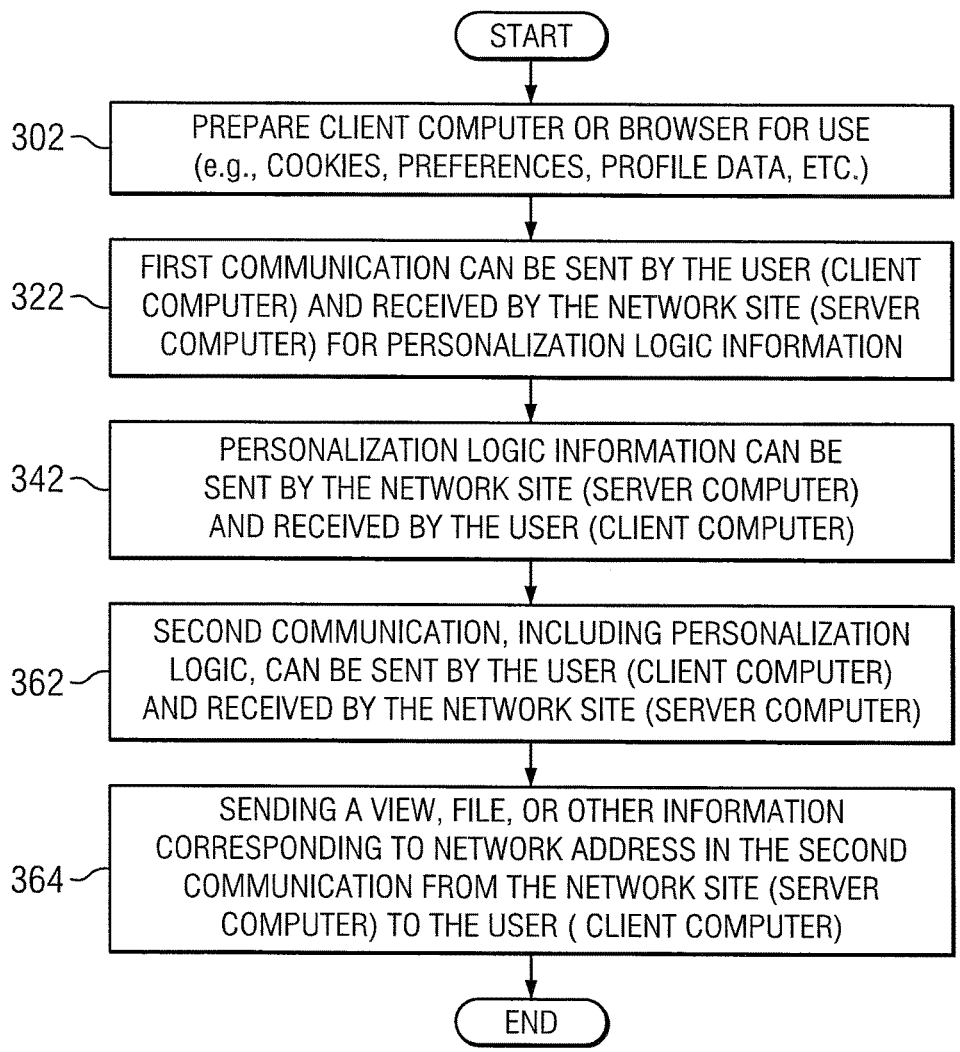
FIG. 3 includes a process flow diagram illustrating a method of communicating between a user and a network site.

In an illustrative embodiment of the invention, the computer-executable instructions may be lines of compiled $C^{++}$, Java, or other language code. Other architectures may be used. For example, the functions of the client computer 12 may be incorporated into the server computer 16, and vice versa. FIG. 3 includes an illustration, in the form of a flow diagram, of the structure of such a software program.

Communications between the client computer 12 and the server computer 16 can be accomplished using radio frequency, electronic, or optical signals. When a user (human) is at the client computer 12, the client computer when sending a communication to the user and may convert input from the user to appropriate signals to be used by the client computer 12 or the server computer 16.

Attention is now directed to FIG. 3, which is related to a method of communicating between a user and a network site. The method can start with a user preparing the client computer 12 or a browser running on client computer 12 for use in accessing information at a network site as shown in block 302. The preparations may include removing at least the cookie(s) that were placed upon the client computer 12 during a prior visit(s) to the network site. Alternatively, the user may remove all cookies from client computer 12 regardless of the specific network site from which the cookies originated.

Alternatively or in addition to the cookie removal, the user may change at least one preference within a browser or other file. Many browsers have multiple user preferences with corresponding settings. In one implementation, all the preferences may be returned to the settings as originally determined (set) by the browser vendor (i.e., settings at the time the browser was sold or downloaded from the vendor). Some browsers may have at least one preference that should be or needs to be set around the time the browser is installed. For example, a browser may require a language selection to complete installation of the browser. In this instance, the browser may not have a language setting when originally purchased or downloaded by the user. The user may note only those preferences that he or she changed during installation of the browser.

The user may further specify other settings for the browser preferences at a later time. The user may use a browser having browser preferences on the client computer 12 to access the network 14 during a first time period. Before using the browser to access the network after that first time period, the user may change any or all of the browser preferences before sending any communications over the network 14 including any communications to server computer 16. The user can prepare the browser by changing the preferences for his or her browser to the original settings as delivered by the vendor or as were changed only as required during installation.

User profile data file(s) can be disabled, deleted, or modified. Disabling a user profile data file may include changing the filename, its extension, or moving the file to a different folder where the browser would not normally look for the file. Modifying may include changing information within the file. Therefore, disabling changes the file name or location, whereas modifying may make changes internal to the file.

The cookies, preferences, and profile data can reside in files on HD 126 and may be disabled, deleted, or modified by the user at client computer 12. In any event, the amount of information being sent over the network to the network site may be kept to a relative minimum or only include that information for which the user believes identification of him or her would be difficult. Therefore, the communication from the user to the network site may not include information substantially sufficient to specifically identify the user.

A first communication can be sent from the user and received by the network site for personalization logic information as shown in block 322 in FIG. 3. The user may be using the client computer 12, and the network site may be controlled by the server computer 16. From the perspective of the server computer 16, the communications are being sent to and received from the client computer (client data processing system) 12. This first communication may be a request for the personalization logic information. The personalization logic information, which may include one or more personalization rules, may be used by the network site in constructing a page, view, or other information that may be sent to the user at client computer 12. A request for personalization logic information can be thought of as including requests for personalization rule(s) and other information that may indicate how data is constructed before sending the constructed information from the server computer 16 to the client computer 12. The personalization logic information can be sent by the network site and received by the user (block 342).

A second communication, including personalization logic, can be sent by the user and received by the network site (block 362). More specifically, the user at client computer 12 may use the personalization logic information insert his or her or own preference information, profile data, or other personal information into the personalization logic information received from the network site. In this manner, the user provides only that data required by the personalization logic. He or she may not be sending unnecessary amounts of personal information over the network 14 to the network site at server computer 16. The second communication may have the completed personalization logic appended to a network address for the network site. The network address may include a request for a page, a file, or other information within database 18 that may be provided by the server computer 16. The page, file, or other information is constructed consistent with the personalization logic provided by the user.

The user's ability to create the personalization logic from the personalization logic information is beneficial to the server computer 16. Because the personalization logic with the user's desired inputs are generated by the user (client computer 12), the server computer 16 does not need to extract personalization information from profile data, preference, or other files to be processed by the server computer 16. This helps to reduce the burden on the server computer 16 and may allow more users to use server computer 16. The server computer 16 should be able to deliver pages or other information to all its users faster.

The method can comprise sending a view, file, or other information corresponding to the network address in the second communication as shown in block 364. The server computer 16 may send that view, file, or other information over the network 14 to client computer 12. The user can access that view, file or other information at client computer 12.

If the user wants to provide additional personal information at a later time or during the same session, he or she can do so. This method may allow a user to investigate a network site in more detail before sending personal information (via a cookie, preference, or profile data when using the browser) that the user would rather not send.

By way of example, the first communication may include information that is less likely to be able to identify a user specifically. Other than an Internet Protocol (IP) address, the information may be associated with many people or be considered less sensitive to many users. Examples of information that may be sent with the first communication may include only minimum information needed for an HTTP communication between the client computer 12 and server computer 16, a linguistic language information, a time-zone information, an IP address, and a territorial information.

A linguistic language may include any of the languages that humans normally communicate with one another outside of the computer industry (not a computer or markup language). Examples include English, French, Japanese, Spanish, and the like. A territorial information may correspond to a territory that has a population of at least 1,000 people. The territorial information may correspond to a state, a province, or a country. In some instances, the territorial information may correspond to a larger (highly populated) city, such as New York, London, Tokyo, Austin, and the like. The territory should not be selected such that the number of individuals is relatively small and makes identification of a user fairly easy. For example, a street on which the user lives or where the client computer 12 is located may have less than 50 people. The identity of the user may be easier compared to specifying a state, country, or larger city.

The second communication may include information that is not included within the first communication. That information may include information sensitive to the user or may be used by another party to stereotype the user based on factual information. Additionally, the user may not want to give information that uniquely identifies him or her. Examples can include the user's name, physical street address, mailing address (postal or electronic), age, race, religion, income, a consumer item preference, a consumer brand preference, a color preference, animal preference, a cookie, or the like. Note that some of the information may be part of a range. For example, the user's age or the income may be specified as a range rather than a precise amount. A consumer item preference may be for a particular type of product or service. For example, the user may like high-performance computers and heavy-metal rock music. Each of these is an example of a consumer item preference. A consumer brand preference may be for a specific maker of goods or services. For example, the user may prefer Ford™ trucks or Nordstrom™ department stores. Skilled artisans appreciate that such information may disclose information from which stereotypes or inferences regarding the user may be drawn.

The methods and data processing system media for carrying out those methods may be beneficial to the user and the network site. More specifically, the user has better control over his or her own personal information. The user can use no or minimal personal information when originally contacting a network site. The user can give more information if he or she desires. Also, the user does not have to rely on a third party to maintain privacy. The server computer 16 for the network site can operate more efficiently and allow more users to use the network or may deliver information to its users quicker. The server computer 16 does not need to generate the personalization logic because the client computer 12 may be used in assembling the personalization logic and append it to network address when communicating with a server computer 16 over the network 14. The benefits described herein may accrue to public and private networks of computers.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of communicating with a network site comprising:
    receiving from a server computer running the network site a personalization rule;
    assembling a personalization logic at a client computer based on the personalization rule received from the server computer;
    sending a communication from the client computer to the server computer running the network site, wherein the communication comprises a network address for the network site; and
    appending the personalization logic to the network address of the network site, wherein the communication further comprises a user information for a user per the personalization rule.

2. The method of claim 1, further comprising sending a request to the server computer running the network site for the personalization rule.

3. The method of claim 1, further comprising:
    using a browser having a browser preference on the client computer to access a network during a first time period;
    changing the browser preference;
    using the browser to access the network during a second time period which is after the first time period; and
    sending the communication during the second time period.

4. A method of communicating with a network site comprising:
    sending a first communication from a client computer of a user to a server computer running the network site, wherein the first communication comprises a request for a personalization rule;
    receiving from the server computer a personalization rule at the client computer in response to the first communication;
    assembling a personalization logic at the client computer based on the personalization rule received from the server computer; and
    appending the personalization logic to a network address of the network site when communicating with the server computer over a network.

5. The method of claim 4, wherein the personalization logic is inserted with user information for a user per the personalization rule.

6. The method of claim 5, wherein the user information which is not part of the first communication is communicated to the server computer in a second communication.

7. The method of claim 5, wherein the personalization rule is part of personalization logic information sent to the client computer.

8. A computer program product comprising a nontransitory computer readable storage medium storing a set of instructions, the set of instructions comprising instructions executable to:
    receive from a server computer running a network site a personalization rule;
    assemble a personalization logic at a client computer based on the personalization rule received from the server computer;
    send a communication from the client computer to the server computer running the network site, wherein the communication comprises a network address for the network site; and
    append the personalization logic to the network address of the network site, wherein the communication further comprises user information for a user per the personalization rule.

9. The computer program product of claim 8, wherein the set of instructions further comprise instructions executable to send a request to the server computer running the network site for the personalization rule.

10. The computer program product of claim 9, wherein in the set of instructions further comprise instructions executable to:
    access a network during a first time period using a browser having a browser preference;
    change the browser preference;
    use the browser to access the network during a second time period which is after the first time period; and
    send the communication during the second time period.

11. A computer program product comprising a nontransitory computer readable storage medium storing a set of instructions, the set of instructions comprising instructions executable to:
    send a first communication from a client computer to a server computer running a network site, wherein the first communication comprises a request for a personalization rule;
    receive from the server computer a personalization rule at the client computer in response to the first communication;
    assemble a personalization logic at the client computer based on the personalization rule received from the server computer; and append the personalization logic to a network address of the network site when communicating with the server computer over a network.

12. The computer program product of claim 11, wherein the personalization logic is inserted with user information for the user per the personalization rule.

13. The computer program product of claim 12, wherein the user information which is not part of the first communication is communicated to the server computer in a second communication.

14. The computer program product of claim 12, wherein the personalization rule is part of personalization logic information sent to the client computer.

15. A system comprising:
a server computer running a network site; and
a client computer coupled to the server computer via a network, the client computer configured to:
receive from the server computer running the network site a personalization rule;
assemble a personalization logic based on the personalization rule received from the server computer;
send a communication from the client computer to the server computer running the network site, wherein the communication comprises a network address for the network site; and
append the personalization logic to the network address of the network site, wherein the communication further comprises user information for a user per the personalization rule.

16. The system of claim 15, wherein the client computer is further executable to send a request to the server computer running the network site for the personalization rule.

17. The system of claim 16, wherein the client computer is further configured to:
access a network during a first time period using a browser having a browser preference;
change the browser preference;
use the browser to access the network during a second time period which is after the first time period; and
send the first communication during the second time period.

18. A system comprising:
a server computer running a network site; and
a client computer coupled to the server computer via a network, the client computer configured to:
send a first communication to the server computer running the network site, wherein the first communication comprises a request for a personalization rule;
receive from the server computer a personalization rule in response to the first communication;
assemble a personalization logic based on the personalization rule received from the server computer; and
append the personalization logic to a network address of the network site when communicating with the server computer over the network.

19. The system of claim 18, wherein the personalization logic is inserted with user information for the user per the personalization rule.

20. The system of claim 19, wherein the user information which is not part of the first communication is communicated to the server computer in a second communication.

* * * * *